United States Patent
Montero

(10) Patent No.: US 9,632,960 B2
(45) Date of Patent: Apr. 25, 2017

(54) I²C BUS PRIORITY ALERT SYSTEM

(71) Applicant: Dell Products L.P., Round Rock, TX (US)

(72) Inventor: Adolfo Sandor Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/704,710

(22) Filed: May 5, 2015

(65) Prior Publication Data
US 2016/0328345 A1 Nov. 10, 2016

(51) Int. Cl.
*G06F 3/00* (2006.01)
*G06F 5/00* (2006.01)
*G06F 13/362* (2006.01)
*G06F 13/20* (2006.01)
*G06F 13/40* (2006.01)

(52) U.S. Cl.
CPC ............ *G06F 13/362* (2013.01); *G06F 13/20* (2013.01); *G06F 13/4068* (2013.01)

(58) Field of Classification Search
None
See application file for complete search history.

(56) References Cited

U.S. PATENT DOCUMENTS

2009/0157928 A1* 6/2009 Riegebauer ........... H04L 12/403
710/110
2014/0095750 A1* 4/2014 Tailliet ................ G06F 13/4282
710/105

* cited by examiner

*Primary Examiner* — David E Martinez
(74) *Attorney, Agent, or Firm* — Haynes and Boone, LLP

(57) ABSTRACT

An inter-integrated circuit (I²C) bus priority alert system includes sender device with a sender I²C connector. The sender device detects a first priority event and, in response, sends a first priority event alert signal through the sender I²C connector. A receiver device includes a receiver I²C connector that is connected to the sender I²C connector on the sender device over an I²C bus. The receiver device receives the first priority event alert signal from the sender device over the I²C bus and, in response, pauses a current data transmission operation that is being performed over the I²C bus. The receiver device then performs a first priority event action associated with the first priority event alert signal that addresses the first priority event such that no further actions are performed by the receiver device to address the first priority event. The receiver device may then resume the current data transmission operation.

11 Claims, 11 Drawing Sheets

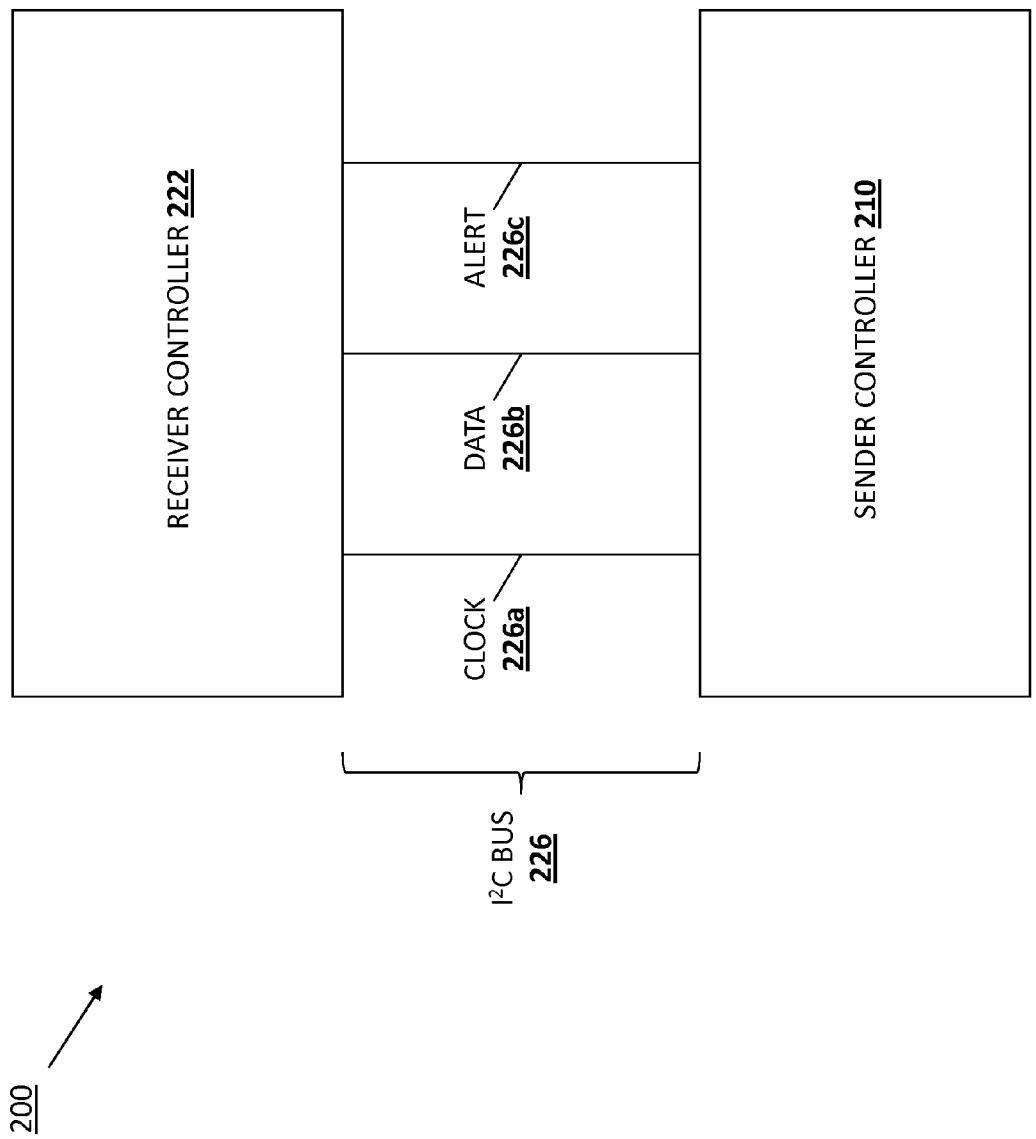

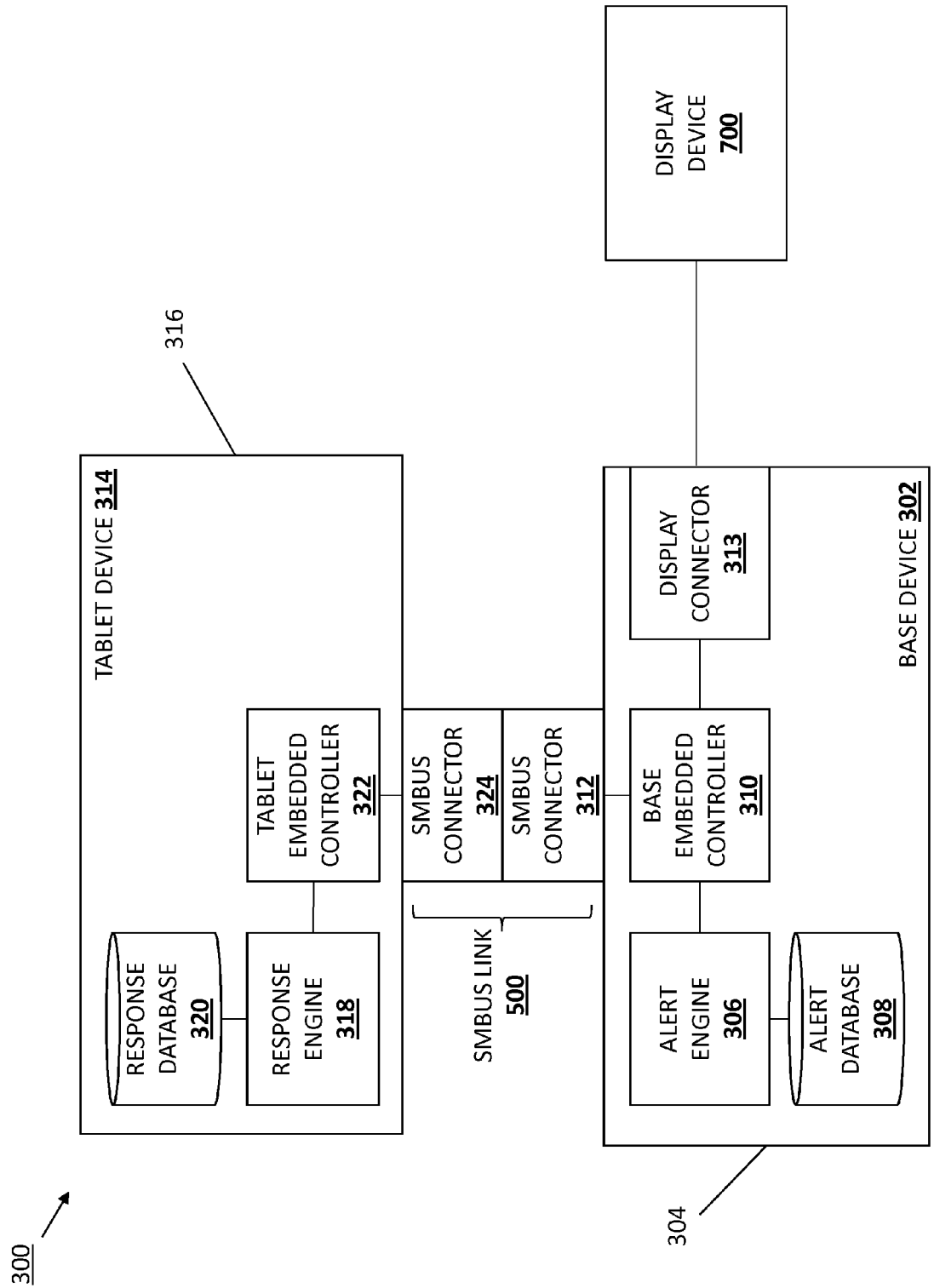

I²C BUS PRIORITY ALERT SYSTEM

BACKGROUND

The present disclosure relates generally to information handling systems, and more particularly to a priority alert system for information handling systems connected through an I²C bus.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, tablet computers, may sometimes be connected to a base system (sometimes referred to as "docks") via an I²C bus that may be used to transmit data between the tablet computer and the base system. The base system may include a keyboard, peripheral device connectors, and/or a variety of other base system features known in the art that may operate to expand the available functionality of the tablet computer. With the tablet computer connected to the base system, in some situations it may be desirable to connect an external display device to a display connector on the base system to allow, for example, the display device to display images from the tablet computer. The connection of the display device to the base system, and more specifically, the alerting of the tablet computer of that connection by the base system over the I²C bus can raise some issues.

For example, conventionally the tablet computer and the base system will transmit data over the I²C bus to perform a variety of communications known in the art, and in the event the display device is connected to the base system, the base system will assert an alert signal over the I²C bus that is received by the tablet computer. If the I²C bus is free (i.e., the tablet computer is not currently transmitting data over the I²C bus to the base system), the tablet computer will address the alert by, for example, performing operations to send video data to the display device through the base system by configuring a video port, sending video data, and/or a variety of other operations known in the art. However, if the I²C bus is not free (i.e., the tablet computer is currently transmitting data over the I²C bus as part of a previously initiated data transmitting operation), the tablet computer will set an alert signal flag, finish the current data transmitting operation, and then address the alert signal when the current data transmitting operation is finished. It has been found that such conventional alert signals sent over I²C buses and the corresponding alert signal responses raise latency issues in that that they may not, for example, meet timing requirements (e.g., a timing requirement for a response by the tablet computer to the connection of the display device to the base system that is intended to ensure a desirable user experience) and, as such, may result in negative user experiences (e.g., a timeout operation such that the display device is not available for use by the user).

Accordingly, it would be desirable to provide an improved alert system for an I²C bus.

SUMMARY

According to one embodiment, an information handling system (HIS) includes an inter-integrated circuit (I²C) connector that is configured to connect to a sender device over an I²C bus; a processing system that is coupled to the I²C connector; and a memory system that is coupled to the processing system and that includes instructions that, when executed by the processing system, cause the processing system to provide a priority event alert response engine that is configured to: receive a first priority event alert signal from the sender device over the I²C bus; pause a current data transmission operation that is being performed over the I²C bus; and perform a first priority event action that is associated with the first priority event alert signal and that addresses a first priority event such that no further actions are performed by the receiver device to address the first priority event.

BRIEF DESCRIPTION OF THE DRAWINGS

FIG. 2c is a schematic view illustrating an embodiment of an I²C bus in the I²C bus priority alert system of FIGS. 2a and 2b.

FIG. 5b is a signal diagram illustrating a non-priority alert signal sent by the base device to the tablet device in the I²C bus priority alert system of FIG. 5a.

FIG. 5c is a schematic view illustrating a priority event that includes a display device being connected to the base device in the I²C bus priority alert system of FIG. 5a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
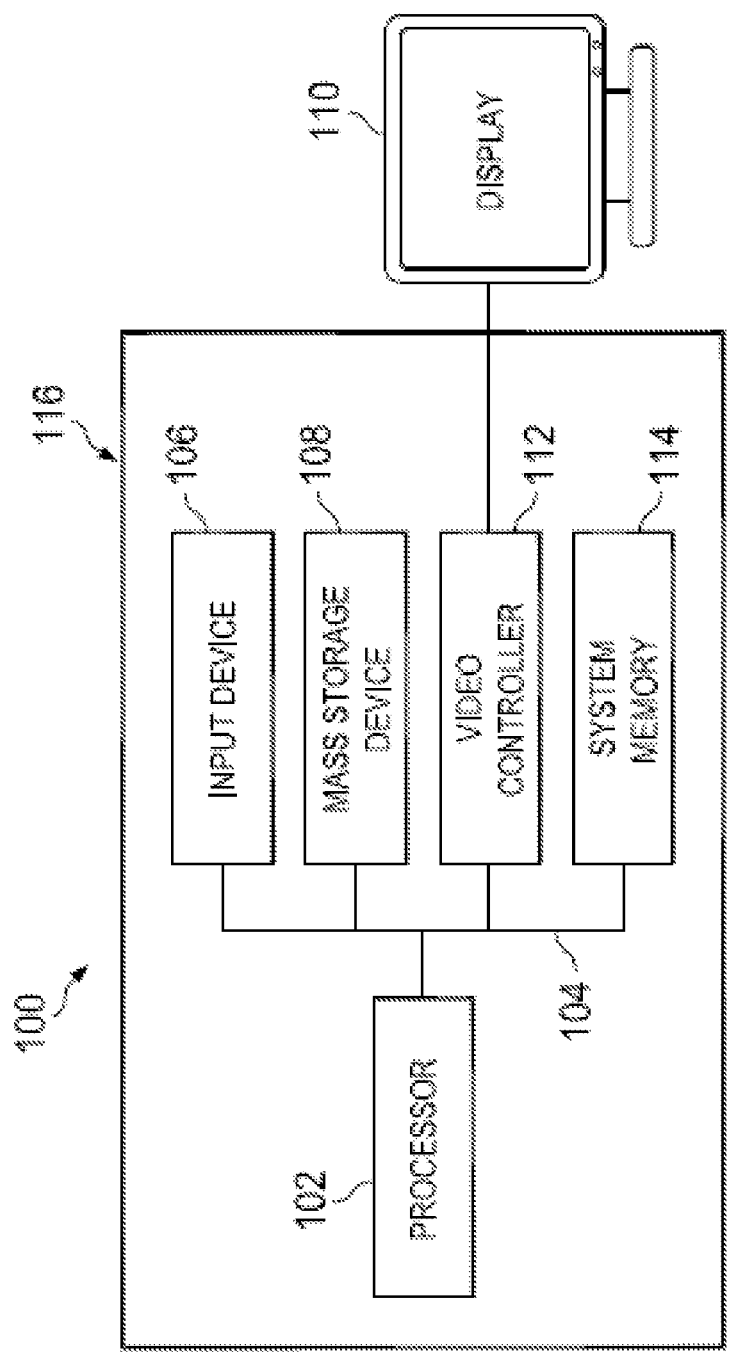
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
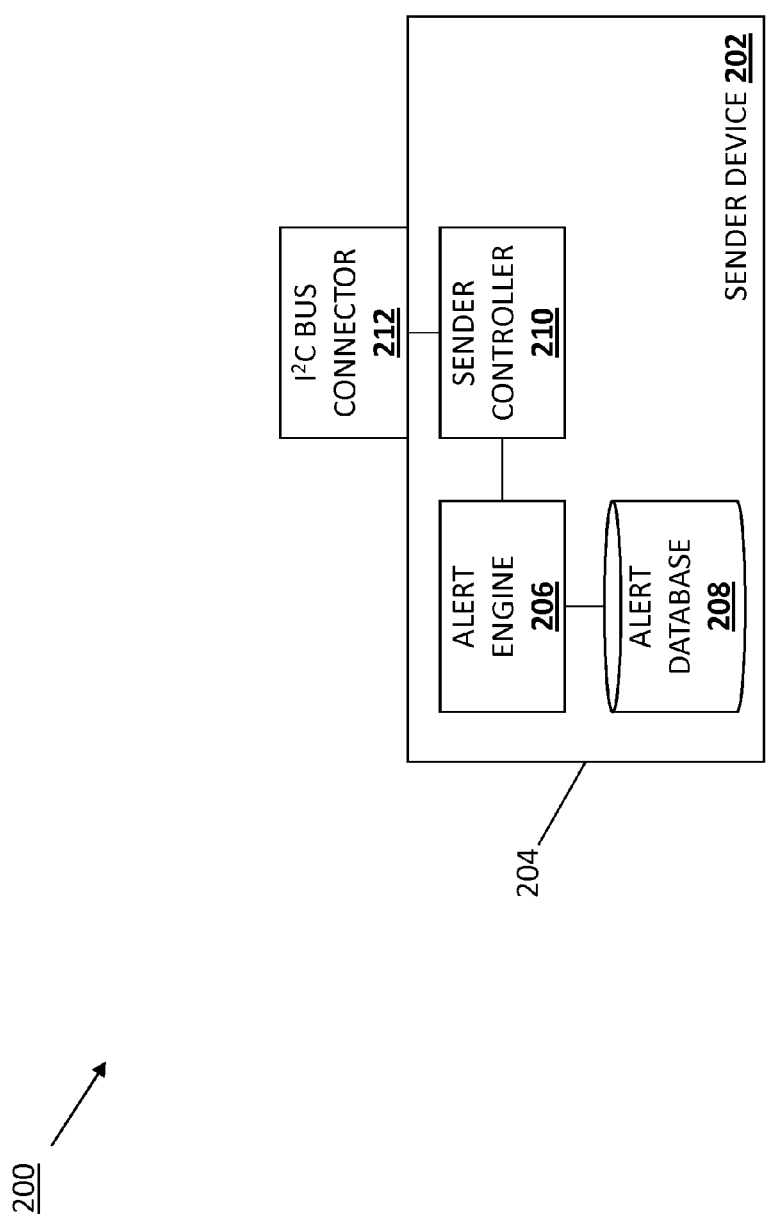
FIG. 2a is a schematic view illustrating an embodiment of a portion an I²C bus priority alert system including a sender device.
Figure 2B:
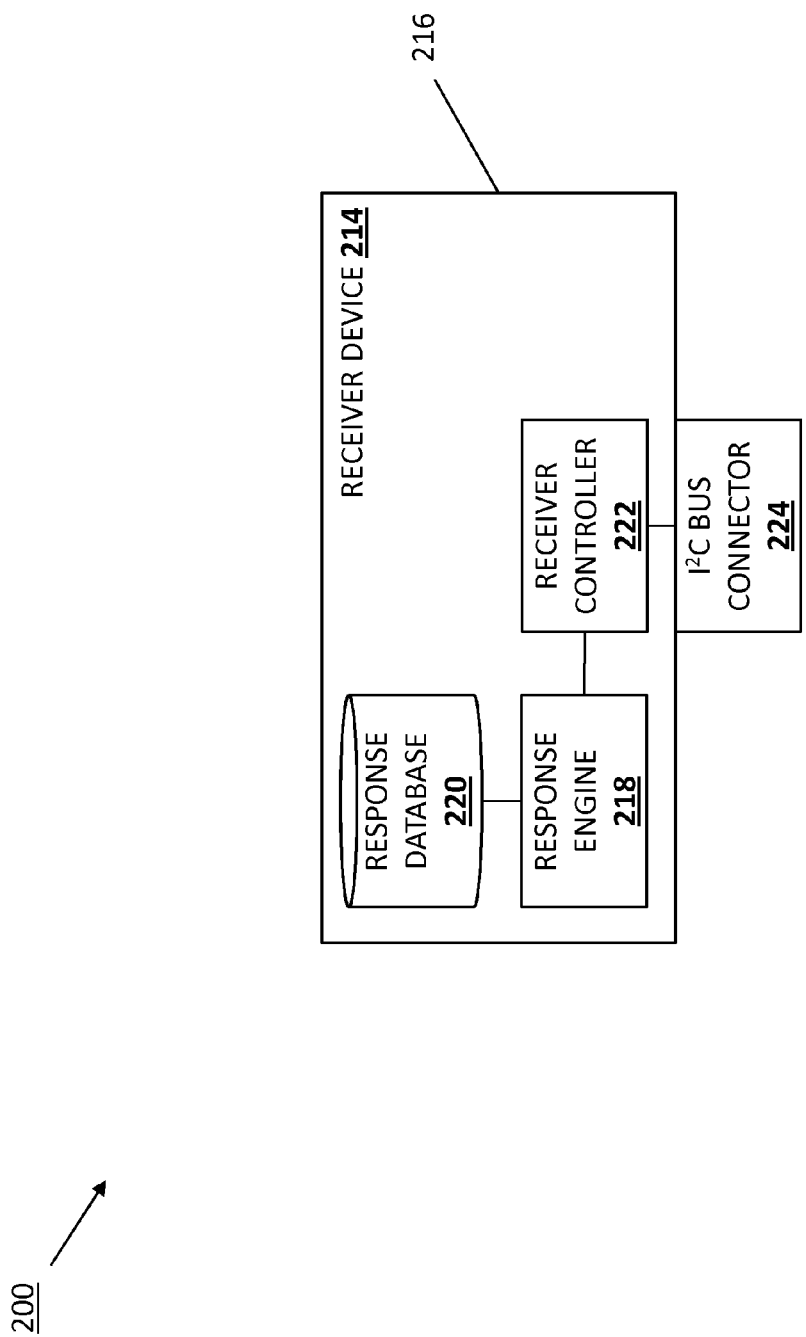
FIG. 2b is a schematic view illustrating an embodiment of a portion an I²C bus priority alert system including a receiver device

Referring now to FIGS. 2a, 2b, and 2c, an embodiment of an Inter-Integrated Circuit (I²C) bus priority alert system 200 is illustrated. As illustrated in FIG. 2a, a portion of the I²C bus priority alert system 200 includes a sender device 202 that may be the IHS 100 discussed above with reference to FIG. 1 and/or that may include some or all of the components of the IHS 100. In an embodiment, the sender device 202 includes a chassis 204 (which may be the chassis 116 discussed above with reference to FIG. 1) that may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an alert engine 206 that is configured to perform the functions of the alert engines and sender devices discussed below. The chassis 204 of the sender device 202 also may house a storage system (not illustrated, but which may include the storage device 118 discussed above with reference to FIG. 1) that stores an alert database 208 that is coupled to the alert engine 206 (e.g., via a coupling between the processing system and the storage system) and that stores associations between events and alert signals, as discussed in further detail below. However, in some embodiments, the alert database 208 may be located outside of the chassis 204 and coupled to the alert engine 206 using methods known in the art. The chassis 204 of the sender device 202 also houses a sender controller 210 that is coupled to the alert engine 206 (e.g., by a coupling between the processing system and the sender controller 210) and to an I²C bus connector 212 that may be provided in and/or accessible on an outer surface of the chassis 204. While illustrated as separate subsystems in the sender device 202, in some embodiments, the alert engine 206, the alert database 208, and the sender controller 210 may be provided by a single sender device subsystem (e.g., provided by the same processing or controller subsystem).

As illustrated in FIG. 2b, a portion of the I²C bus priority alert system 200 also includes a receiver device 214 that may be the IHS 100 discussed above with reference to FIG. 1 and/or that may include some or all of the components of the IHS 100. In an embodiment, the receiver device 214 includes a chassis 216 (which may be the chassis 116 discussed above with reference to FIG. 1) that houses a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a response engine 218 that is configured to perform the functions of the response engines and receiver devices discussed below. The chassis 216 of the receiver device 214 also may house a storage system (not illustrated, but which may include the storage device 118 discussed above with reference to FIG. 1) that stores a response database 220 that is coupled to the response engine 218 (e.g., via a coupling between the processing system and the storage system) and that stores associations between alert signals and event actions, as discussed in further detail below. However, in some embodiments, the response database 220 may be located outside of the chassis 216 and coupled to the response engine 218 using methods known in the art. The chassis 216 of the receiver device 214 also houses a receiver controller 212 that is coupled to the response engine 218 (e.g., by a coupling between the processing system and the receiver controller 212) and to an I²C bus connector 224 that may be provided in and/or accessible on an outer surface of the chassis 216. While illustrated as separate subsystems in the receiver device 214, in some embodiments, the response engine 218, the response database 220, and the response controller 222 may be provided by a single receiver device subsystem (e.g., provided by the same processing or controller subsystem).

Referring to FIGS. 2a-2c, the I²C bus connector 212 on the sender device 202 may be coupled to the I²C bus connector 224 on the receiver device 214 to provide an I²C bus 226 that connects the sender controller 210 to the receiver controller 222. As is known in the art, the I²C bus 226 may be a multi-master, multi-slave, single ended, serial computer bus that is utilized in attaching relatively lower-speed peripherals to processors. In some embodiments, the I²C bus 226 may be a System Management Bus (SMBus), with the I²C bus connector 212 on the sender device 202 being a SMBus connector and the I²C bus connector 224 on the receiver device 214 being a SMBus connector. As is known in the art, and I²C bus and an SMBus may include substantially similar connector types and signals, and may differ in the communication protocol that is utilized (i.e., SMBus may use a more "restrictive" protocol relative to I²C). However, while specific examples are provided, the I²C bus 226 may be a variety of different I²C buses known in the art, with the I²C bus connectors 212 and 224 being compatible to connect and and/or provide that I²C bus. Furthermore, one of skill in the art in possession of the present disclosure will recognize that the teachings of the present disclosure may be incorporated by buses other than I²C buses, and thus may fall within its scope as well.

FIG. 2c illustrates the I²C bus 226 provided between the sender controller 210 and the receiver controller 222 with other features of the I²C bus priority alert system 200 removed for clarity. The I²C bus 226 in the illustrated embodiment includes a clock line 226a and a data line 226b that may be used to transmit data between the sender controller 210 and the receiver controller 222, as well as an alert line 226c that may be used by the sender controller 210 and/or the receiver controller 222 to send an alert to the other, discussed in further detail below. While a specific embodiment of the I²C bus 226 is illustrated and described in FIG. 2c, one of skill in the art in possession of the present disclosure will recognize that a variety of different features (e.g., a suspend line) other than those illustrated may be provided in the I²C bus 226 while remaining within the scope of the present disclosure. Furthermore, one of skill in the art in possession of the present disclosure will recognize that the terms "sender" and "receiver" have been used for clarity in describing the operation of the I²C bus priority alert system 200 below, and that the receiver device 214/receiver controller 222 may send data and the sender device 202/sender controller 210 may receive data over the I²C bus 226 while remaining within the scope of the present disclosure.

Figure 3:
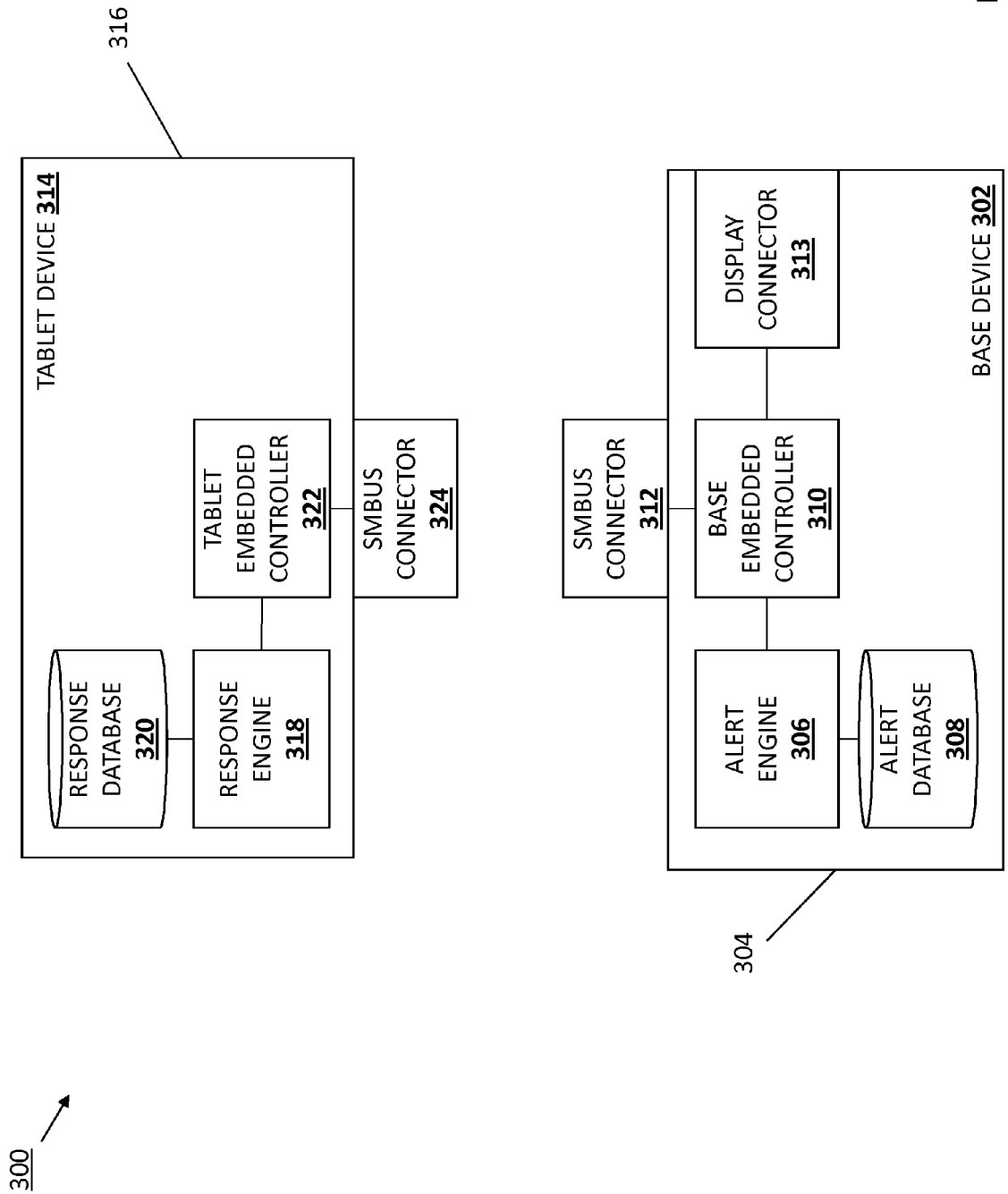
FIG. 3 is a schematic view illustrating an embodiment of an I²C bus priority alert system.

Referring now to FIG. 3, a specific embodiment of an I²C bus priority alert system 300 is illustrated that includes similar features to the I²C bus priority alert system 200 discussed above with reference to FIG. 2. As such, similar reference numbers are provided to indicate that similarity (e.g., elements of the I²C bus priority alert system 200 beginning with a reference number "2" may correspond to elements of the I²C bus priority alert system 300 beginning with a reference number "3"). The I²C bus priority alert system 300 includes a base device 302 that is discussed below as being a keyboard base device for a tablet computing system that provides a keyboard, peripheral device connectors, and/or a variety of other base device features known in the art for extending the functionality and operability of the tablet device. The base device 302 includes a chassis 304 that may house a processing system and a memory system that includes instructions that, when executed by the processing system, cause the processing system to provide an alert engine 306 that is configured to perform the functions of the alert engines and base devices discussed below. The chassis 304 of the base device 302 also may house a storage system that stores an alert database 308 that is coupled to the alert engine 306 and that stores associations between events and alert signals, as discussed in further detail below. The chassis 304 of the base device 302 also houses a base embedded controller 310 that is coupled to the alert engine 306 and to an SMBus connector 312 that may be provided in and/or accessible on an outer surface of the chassis 304. As discussed above, the alert engine 306 and the base embedded controller 310 may be provided in a single base device subsystem (e.g., an embedded controller in the base device 302). In the illustrated embodiment, the base device 302 also includes a display connector 313 that is coupled to the base embedded controller 310 and that may include a variety of display device connectors known in the art. While a single display connector 313 is illustrated for clarity, the base device 302 may include a variety of other peripheral device connectors known in the art, as well as a keyboard or other input devices known in the art, and/or any other base device features known in the art while remaining within the scope of the present disclosure.

In the illustrated embodiment, the I²C bus priority alert system 300 also includes a tablet device 314 that may be a variety of tablet computing devices known in the art that are configured to connect to a base device, as well as a variety of other mobile computing devices known in the art with similar functionality. The tablet device 314 includes a chassis 316 that may house a processing system and a memory system that includes instructions that, when executed by the processing system, cause the processing system to provide a response engine 318 that is configured to perform the functions of the response engines and tablet devices discussed below. The chassis 316 of the tablet device 314 also may house a storage system that stores a response database 320 that is coupled to the response engine 318 and that stores associations between alert signals and event actions, as discussed in further detail below. The chassis 316 of the tablet device 314 also houses a tablet embedded controller 322 that is coupled to the response engine 318 and to an SMBus connector 324 that may be provided in and/or accessible on an outer surface of the chassis 316. As discussed above, the response engine 318 and the tablet embedded controller 322 may be provided in a single tablet device subsystem (e.g., an embedded controller in the tablet device 314).

As discussed in further detail below, the tablet device 314 may be coupled to the base device 302 by engaging the SMBus connector 324 with the SMBus connector 312 to provide an SMBus link between the tablet embedded controller 322 and the base embedded controller 310. Details of the SMBus can be found in the SMBus Specification Version 2.0 released Aug. 3, 2000, and thus are not discussed herein in detail. However, reference to the I²C bus 226, illustrated in FIG. 2c and discussed above, is made below to describe the components and the functionality of the SMBus that connects the tablet embedded controller 322 and the base embedded controller 310 in the method discussed below.

Figure 4:
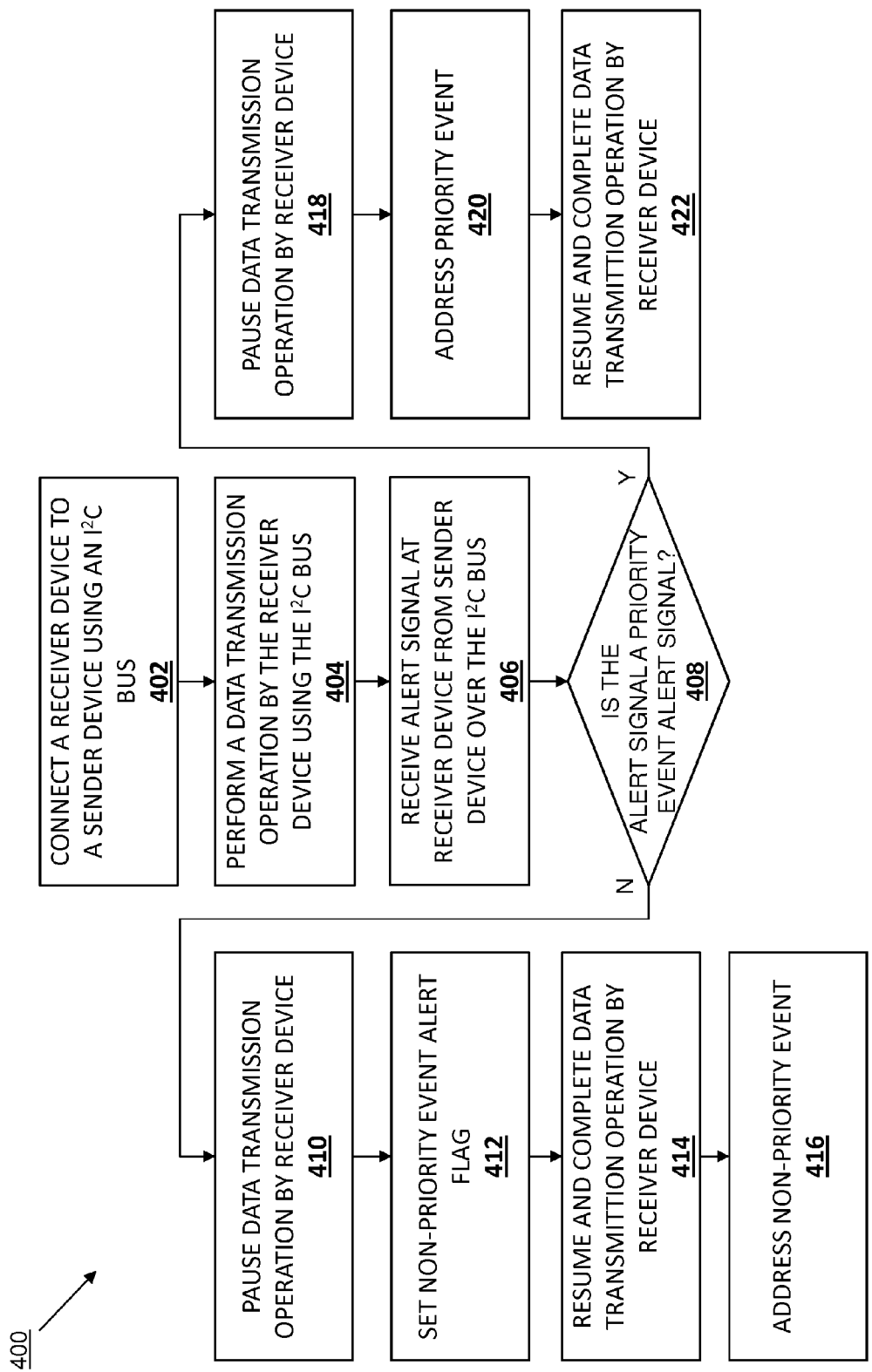
FIG. 4 is a flow chart illustrating an embodiment of a method for providing priority alerts over an I²C bus.

Referring now to FIG. 4, an embodiment of a method 400 for providing a priority alert over an I²C bus is illustrated. The embodiment of the method 400 is illustrated and discussed below using the specific embodiment of the I²C bus priority alert system 300 discussed above with reference to FIG. 3 and, particularly with respect to the provision of and response to a priority event alert (which may be referred to as an "interrupt") based on the connection of a peripheral device to the system. However, one of skill in the art in possession of the present disclosure will recognize that other I²C bus priority alert systems (e.g., the I²C bus priority alert system 200 discussed above with reference to FIG. 2) may operate according to the method 400 to provide and respond to a priority event alert for a wide variety of priority events that may depend on different user and device specifications. As such, the priority event alerting of the tablet device by the base device when a priority event occurs that includes a peripheral device being connected to the base device is provided as merely an example of the method 400, and the priority alerting of a receiver device by a sender device in response to any priority event that occurs while the receiver device is utilizing the I²C bus (and that is not limited to peripheral devices being connected to the sender device) is envisioned as falling within the scope of the present disclosure.

Figure 5A:
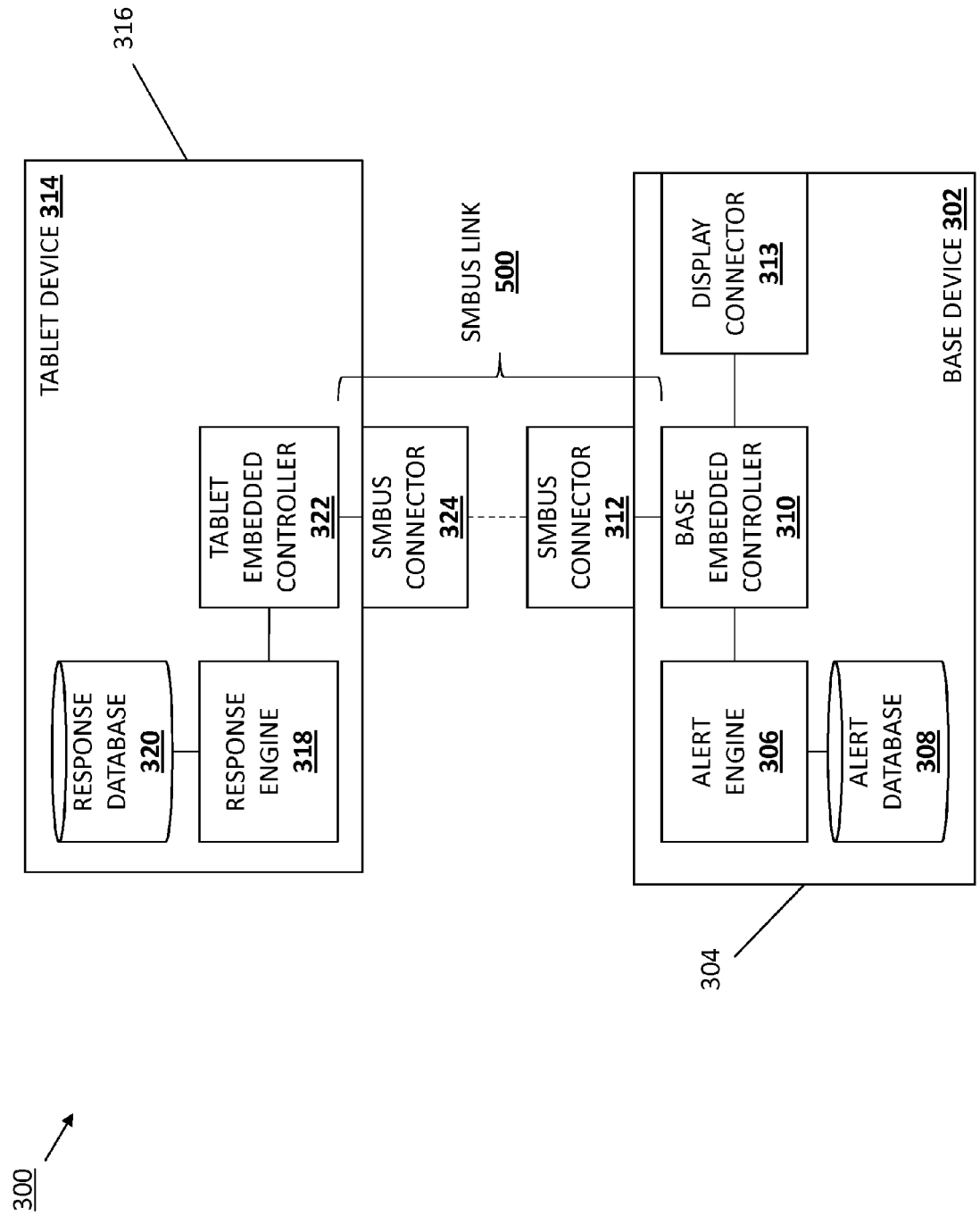
FIG. 5a is a schematic view illustrating a tablet device coupled to a base device in the I²C bus priority alert system of FIG. 3.

Referring to FIGS. 4 and 5a, the method 400 begins at block 402 where a receiver device is connected to a sender device using an I²C bus. FIG. 5a illustrates the tablet device 314 connected to the base device 302 by an SMBus link 500 that is provided between the tablet embedded controller 322 and the base embedded controller 310 in response to connecting the SMBus connector 324 to the SMBus connector 312. In different embodiments, a user of the tablet device 314 may wish to increase, expand, and/or otherwise extend the functionality of the tablet device 314 using the base device 302 in order to, for example, utilize a physical keyboard provided on the base device 302, connect a peripheral device to the tablet device using a connector on the base device 302, utilize a storage system included on the base device 302, and/or perform a variety other extended functionality actions known in the art. As such, the user may bring the tablet device 314 adjacent the base device 302 such that SMBus connector 324 is adjacent the SMBus connector 310, and move the tablet device 314 towards the base device 302 such that the SMBus connectors 322 and 310 engage to provide the SMBus link 500 between the tablet embedded controller 322 and the base embedded controller 310.

The method 400 then proceeds to block 404 where a data transmission operation is performed by the receiver device using the I²C bus. In an embodiment, the tablet embedded controller 322 in the tablet device 314 may perform a variety of data transmission operations at block 404 that result in the tablet embedded controller 322 utilizing the SMBus link 500 to transmit data. For example, the data transmission operations performed at block 404 may include the base device 302 and/or the tablet device 314 transmitting keyboard input (e.g., "keystroke") data, touchpad input data, battery information, and/or a variety of other data known in the art using the SMBus link 500. The method 400 then proceeds to block 406 where an alert signal is received by the receiver device from the sender device over the I²C bus. The discussion of the method 400 below assumes that the alert signal is received by the receiver device over the I²C bus while the receiver device is currently performing the data transmission operation using the I²C bus as discussed with reference to block 404. However, one of skill in the art in possession of the present disclosure will recognize that if an alert signal is received while the receiver device is not currently performing data transmission operations using the I²C bus (i.e., the I²C bus is "free" or otherwise available for any data transmission operations), the receiver device may determine an event associated with that alert signal, receive details about the event using the I²C bus (as it is not currently being utilized), and immediately address that event.

In an embodiment, the base device 302 may associate one or more events with alert signals in the alert database 308, and at block 406, an event may be detected by the base embedded controller 310 and communicated to the alert engine 306. In response to being alerted of an event, the alert engine 306 may access the alert database 308 and determine an alert signal that is associated with that event, and communicate that alert signal to the base embedded controller 310. The base embedded controller 310 may then assert that alert signal over an alert line in the SMBus link 500 (e.g., the alert line 226c in the I²C bus 226 discussed above with reference to FIG. 2c), and the tablet embedded controller 322 will detect that alert signal. The details of different alert signals associated with different events are discussed in further detail below, and one of skill in the art in possession of the present disclosure will recognize that the base embedded controller 310 and the alert engine 306 may operate to detect events, retrieve the associated alert signal for that event from the alert database 308, and assert that alert signal such that it is detected by the tablet device 314 as discussed below. However, in some embodiments, the software code in the base embedded controller 310 may have the sending of the alert signal encoded as a response to detecting the event. As discussed in further detail below, the event(s) associated with alert signal(s) in the alert database 308 may include non-priority events such as keyboard input data, touchpad input data, battery information, and/or a variety of o other non-priority events known in the art; and priority event such as the connection of a peripheral device to the base device 302 and/or a variety of other timing-critical priority events known in the art. As such, any of those events may be detected by the base device 302 at block 406 and used to provide an associated alert signal to the tablet device 314 as discussed above.

The method 400 then proceeds to decision block 408 where the receiver device determines whether the alert signal is a priority event alert signal. As discussed below, the receiver device may distinguish a priority event alert signal from non-priority event alert signals based on the alert signal including one or more pulses. In addition, the tablet device 314 may associate one or more alert signals with event actions in the response database 320, and each those event actions may correspond to one of the non-priority events and priority events discussed above. At block 408, the tablet embedded controller 322 in the tablet device 314 provides the alert signal received at block 406 to the response engine 318 and, in response to receiving the alert signal, the response engine 318 may access the response database 320 and determine an event action that is associated with that alert signal. As such, at decision block 408 the response engine 318 in the tablet device 314 operates to determine whether the alert signal received at block 406 is associated in the response database 320 with a non-priority event action for a non-priority event, or a priority event action for a priority event.

Figure 5B:
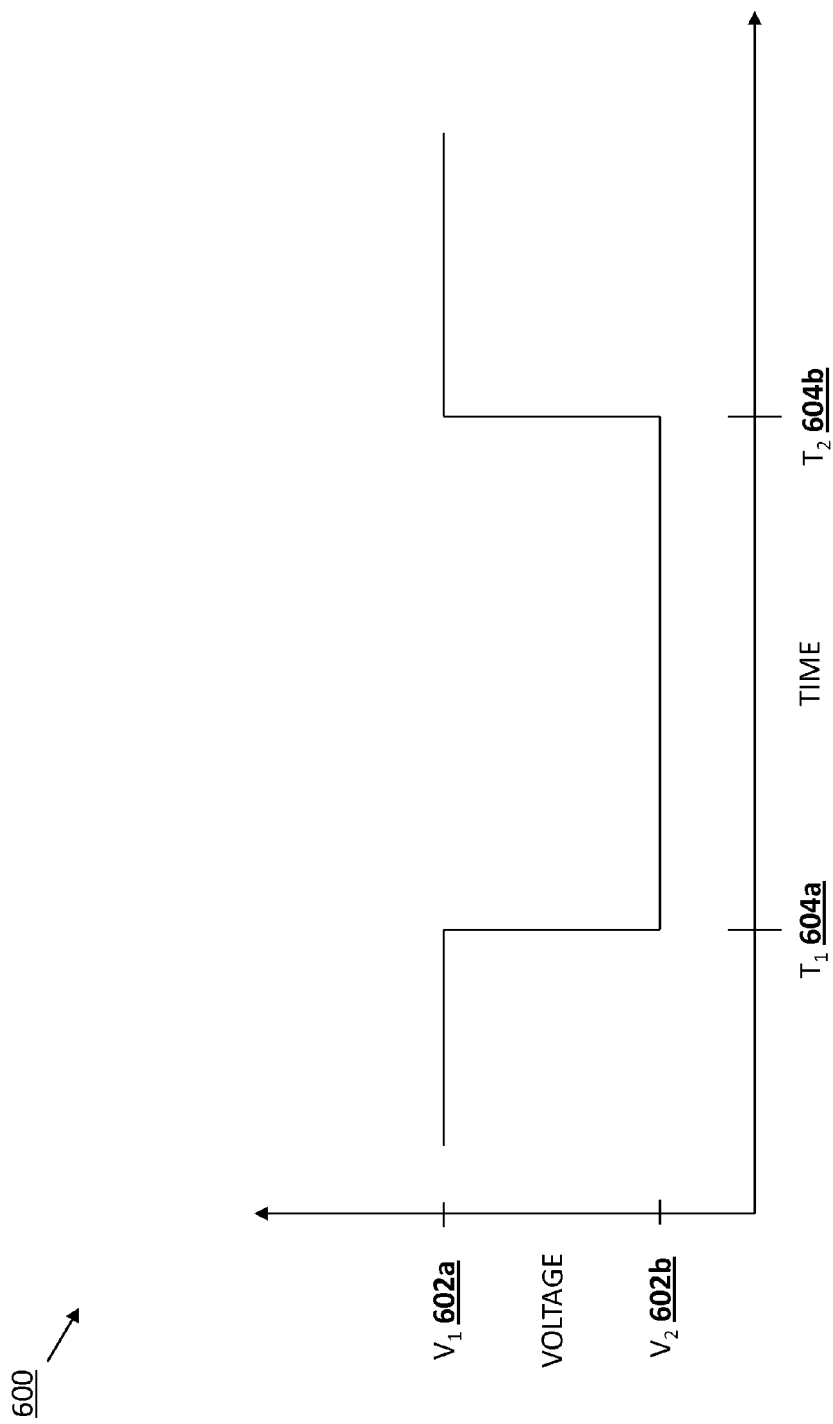

Referring now to FIG. 5b, an embodiment of a non-priority event alert signal 600 being asserted on the alert line (e.g., the alert line 226c) of the SMBus link 500 is illustrated. One of skill in the art in possession of the present disclosure will recognize that the non-priority event alert signal 600 is a conventional I²C bus alert signal that is utilized on conventional I²C bus alert systems known in the art. As can be seen, prior to the non-priority event alert signal 600 being asserted (e.g., at block 404 of the method 400 and prior to time $T_1$ 604a), a voltage on the alert line of the SMBus link 500 is high at $V_1$ 602a. The assertion of the alert signal at time $T_1$ 604a by the base device 302 is indicated by the voltage on the alert line of the SMBus link 500 dropping low at $V_2$ 602b. In an embodiment, that drop in voltage on the alert line of the SMBus link 500 is detected by the tablet embedded controller 322 at block 406 of the method 400 and results in the triggering of an interrupt service routine (ISR). In an embodiment, at decision block 408, subsequent to detecting the drop in voltage to $V_2$ 602b, the tablet embedded controller 322 then monitors the alert line on the SMBus link 500 to determine whether an alert line pulse is being asserted to determine whether the alert signal is a priority event alert signal.

As discussed in further detail below, non-priority event alert signals asserted on the alert line of the SMBus link 500 may be distinguished from priority event alert signals asserted on the alert line of the SMBus link 500 by one or more alert pulses (illustrated and discussed below) following the time $T_1$ 604a when the alert signal is asserted and prior to a time $T_2$ 604b when a conventional alert signal would be de-asserted such that the voltage on the alert line returns high at $V_1$ 602a. While the time period between time $T_1$ 604a and time $T_2$ 604b in which a conventional alert signal is typically asserted may vary, one of skill in the art in possession of the present disclosure will recognize that time period is typically selected such that the receiver device may perform conventional $I^2C$ bus alert operations that include detecting the alert signal, entering an interrupt service routine (ISR), setting an alert flag, and exiting the ISR to continue the previous data transmission operations that were being conducted when the alert signal was asserted. As such, that time period is typically relatively short in order to ensure other alert signals may be asserted on the alert line if necessary. For example, the alert signal may remain asserted long enough for the duration of the ISR, typically in the tens of microseconds and not exceeding one millisecond.

In an embodiment, the tablet embedded controller 322 may include alert signal detection circuitry that is connected to the alert line in the SMBus link 500 and that goes active if the alert signal is asserted (e.g., drops from high at $V_1$ 602a to low at $V_2$ 602b) and results in the triggering of the ISR. In an embodiment, at decision block 408 the alert signal detection circuitry in the tablet embedded controller 322 may go active upon the assertion of the alert signal, and then the response engine 318 may instruct the tablet embedded controller 322 to immediately reset the alert signal detection circuitry. The tablet embedded controller 322 may then again monitor to determine whether the alert signal detection circuitry goes active again in a predetermined time period that is less than the time period between time $T_1$ 604a and time $T_2$ 604b discussed above (a predetermined time period that may also be determined based on possible priority event alert signals that may be asserted, discussed in further detail below). For example, the predetermined time period may be some number of instruction cycles (e.g., between 2 and 10 instruction cycles) that allows the response engine 318 to distinguish between non-priority event alert signals that do not include alert pulses and priority event alert signal that include alert pulses.

If at decision block 408 the receiver device determines that the alert signal is a non-priority event alert signal (e.g., the non-priority event alert signal 600 illustrated in FIG. 5b), the method 400 then proceeds to blocks 410, 412, 414, and 416, which one of skill in the art will recognize provide a conventional response to the assertion of a conventional alert signal in a conventional $I^2C$ bus alert system. At decision block 408, the response engine 318 may monitor the alert line of the SMBus link 500 and determine that no alert pulses have been detected following the time $T_1$ 604a for the predetermined time period (e.g., the alert signal detection circuitry in the tablet embedded controller 322 has not again gone active in the predetermined time period after the reset following going active at time $T_1$ 604a). In response, the response engine 318 will determine that the alert signal is a non-priority event alert signal that is associated with a non-priority event action that includes the actions detailed in blocks 410-416, and will proceed to those blocks as discussed below. Due to the blocks 410-416 detailing conventional actions in response to a conventional alert signal in a conventional $I^2C$ bus alert system, those blocks are not described in detail, and one of skill in the art in possession of the present disclosure will recognize that the actions discussed below with regard to blocks 410-416 may include other functions that may be performed while remaining within the scope of the present disclosure.

At block 410, the data transmission operation is paused by the receiver device. In an embodiment, the response engine 318 instructs the tablet embedded controller 322 to perform a non-priority event action, and the tablet embedded controller 322 enters an interrupt service routine (ISR) such that the data transmission operation that was being performed as discussed with reference to block 404 is paused. The method 400 then proceeds to block 412 where a non-priority event alert flag is set. In an embodiment, the tablet embedded controller 322 then sets a non-priority event alert flag indicating that the non-priority event alert signal was asserted. The method 400 then proceeds to block 414 where the data transmission operation is resumed and completed by the receiver device. In an embodiment, following the setting of the non-priority event alert flag, the tablet embedded controller 322 exits the ISR and immediately returns to the data transmission operation that was paused at block 410, resumes that data transmission operation, and completes that data transmission operation. The method 400 then proceeds to block 416 where the non-priority event is addressed. In an embodiment, upon completing the data transmission operation, the tablet embedded controller 322 determines that the non-priority event alert flag is set and, in response, communicates with the base device 302 to determine the non-priority event type of the non-priority event for which the non-priority event alert signal was asserted. Upon determining the non-priority event type, the tablet embedded controller 322 may operate to address the non-priority event according to its non-priority event type.

Returning back to block 406 and with reference to FIG. 5c, an embodiment of a priority event is illustrated. In an embodiment, at block the 406 a priority event may include the connection of a peripheral device to the sender device. For example, FIG. 5c illustrates a display device 700 connected to the display connector 313 on the base device 302. In response to the connection of the display device 700 to the display connector 313, the base embedded controller 310 will detect the connection of the display device 700 as an event (e.g., a Hot Plug Detect (HPD) event) and provide that event to the alert engine 306. The alert engine 306 may then access the alert database 308 to determine an alert signal associated with that event, and the alert engine 306 will instruct the base embedded controller 310 to assert that alert signal on the alert line of the SMBus link 500 such that it is received by the tablet embedded controller 322. However, the software code in the base embedded controller 310 may, upon detecting the connection of the display device via the HPD event, include instructions that encode the priority alert signal with the pulses discussed below. At block 408, the tablet embedded controller 322 in the tablet device 314 provides the alert signal received at block 406 to the response engine 318 and, in response to receiving the alert signal, the response engine 318 may access the response database 320 and determine an event action that is associated with that alert signal. As such, at decision block 408 the response engine 318 in the tablet device 314 operates to determine whether the alert signal received at block 406 is associated in the response database 320 with a non-priority event action for a non-priority event, or a priority event action for a priority event.

Figure 5D:
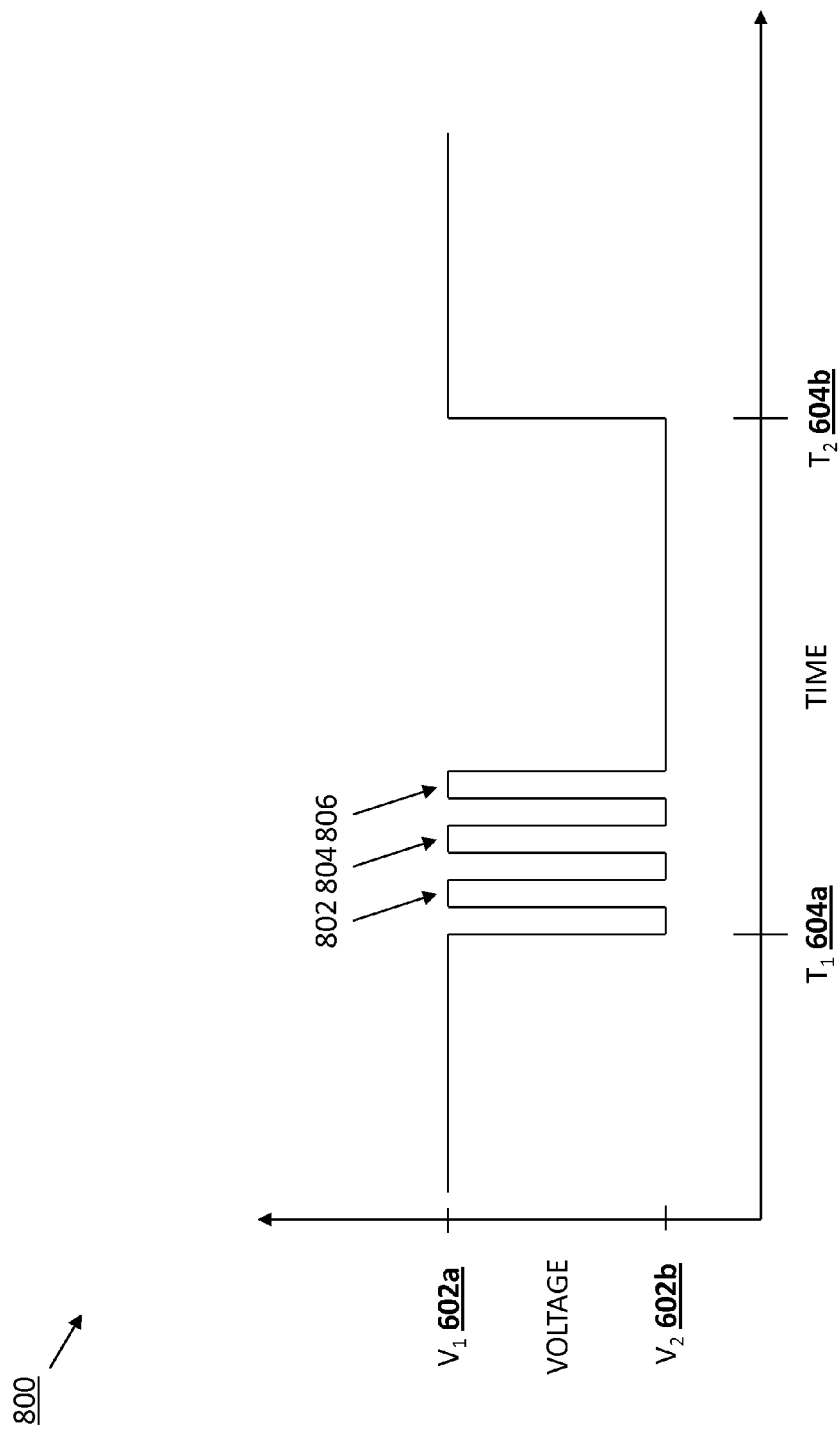
FIG. 5d is a signal diagram illustrating a first priority event alert signal sent by the base device to the tablet device in the I²C bus priority alert system of FIG. 5c.

Referring now to FIG. 5d, an embodiment of a priority event alert signal 800 being asserted on the alert line (e.g., the alert line 226c) of the SMBus link 500 is illustrated. As can be seen, prior to the priority event alert signal 800 being asserted (e.g., at block 404 of the method 400 and prior to time $T_1$ 604a), a voltage on the alert line of the SMBus link 500 is high at $V_1$ 602a. The assertion of the alert signal at time $T_1$ 604a by the base device 302 is indicated by the voltage on the alert line of the SMBus link 500 dropping to low at $V_2$ 602b. In an embodiment, that drop in voltage on the alert line of the SMBus link 500 is detected by the tablet embedded controller 322 at block 406 of the method 400 and results in the triggering of an interrupt service routine (ISR). In an embodiment, at decision block 408, subsequent to detecting the drop in voltage to $V_2$ 602b, the tablet embedded controller 322 then monitors the alert line on the SMBus link 500 to determine whether an alert line pulse is being asserted to determine whether the alert signal is a priority event alert signal. In an embodiment, the detection of pulse(s) in the alert signal is fast enough to synchronize with single microsecond timing of instructions within the ISR, which minimizes the timing impact for such detection.

As discussed above, priority event alert signals asserted on the alert line of the SMBus link 500 may be distinguished from non-priority event alert signals asserted on the alert line of the SMBus link 500 by one or more alert pulses following the time $T_1$ 604a when the alert signal is asserted and prior to a time $T_2$ 604b when a conventional alert signal would be de-asserted such that the voltage on the alert line returns high at $V_1$ 602a. While the time period between time $T_1$ 604a and time $T_2$ 604b in which a conventional alert signal is typically asserted may vary, one of skill in the art in possession of the present disclosure will recognize that time period may be selected to accommodate any of the priority event alert signals discussed herein such that the receiver device may detect different priority alert signals, enter an interrupt service routine, address associated priority events, and exit the interrupt service routine to continue the previous data transmission operations that were being conducted when the priority event alert signal was asserted. As such, that time period may be relatively short in order to allow other alert signals to be asserted on the alert line, but may be extended as desired to allow for any priority alert signal.

As discussed above, the tablet embedded controller 322 may include alert signal detection circuitry that is connected to the alert line in the SMBus link 500 and that goes active if the alert signal is asserted (e.g., drops from high at $V_1$ 602a to low at $V_2$ 602b). Thus, at decision block 408 the alert signal detection circuitry in the tablet embedded controller 322 may go active upon the assertion of the alert signal, and then the response engine 318 may instruct the tablet embedded controller 322 to immediately reset the alert signal detection circuitry. The tablet embedded controller 322 may then again monitor to determine whether the alert signal detection circuitry goes active again upon the re-assertion of the alert signal, and if so, the response engine 318 may again instruct the tablet embedded controller 322 to immediately reset the alert signal detection circuitry.

Figure 5E:
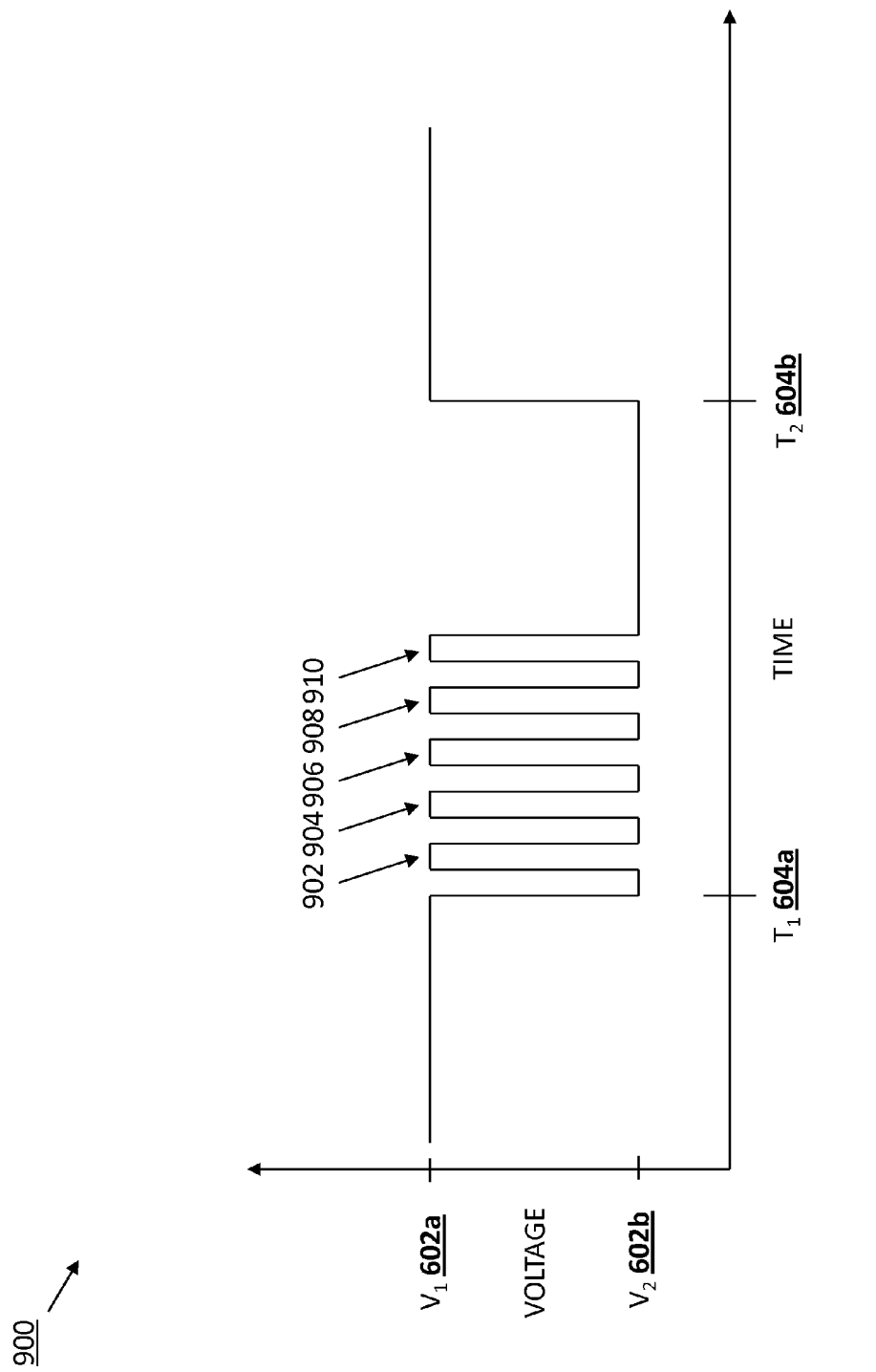
FIG. 5e is a signal diagram illustrating a second priority event alert signal sent by the base device to the tablet device in the I²C bus priority alert system of FIG. 5c

FIG. 5d illustrates the priority event alert signal 800 that is asserted at time $T_1$ 604a, and then de-asserted/reasserted following $T_1$ 604 and prior to $T_2$ 604b to provide alert signal pulses 802, 804 and 806. FIG. 5e illustrates a priority event alert signal 900 that is asserted at time $T_1$ 604a, and then de-asserted/reasserted following $T_1$ 604 and prior to $T_2$ 604b to provide alert signal pulses 902, 904, 906, 908, and 910. In some embodiments, blanking intervals may be provided around the alert signal pulse events to ensure that alert signal pulses in the alert signal are not due to signal bounce. For example, in embodiments such as "docking" where two signal connectors are mating and a natural signal bounce in the connectors may occur, blanking intervals may be used to avoid detecting such signal bounce as a valid signal. However, such embodiments may lengthen the ISR and increase latency. One of skill in the art in possession of the present disclosure will recognize that the assertion of the alert signals with different numbers of alert pulses, along with the resetting of the alert signal detection circuitry after it goes active upon such assertions, allow the tablet embedded controller 322 to report, and the response engine 318 to determine, the number of pulses provided in a priority alert signal that is asserted on the alert line in the SMBus link 500. As such, the alert signal on the alert line in the SMBus link 500 may be "pulsed" or reasserted multiple times to provide different priority event alert signals that may be distinguished based on the number of alert pulses that are provided.

If at decision block 408 the receiver device determines that the alert signal is a priority event alert signal (e.g., the priority event alert signals 800 or 900 illustrated in FIG. 5d or 5e), the method 400 then proceeds to blocks 418, 420, and 422. At decision block 408, the response engine 318 may monitor the alert line of the SMBus link 500 and determine that at least one alert pulse has been detected following an initial assertion of the alert signal at the time $T_1$ 604a and during the predetermined time period (e.g., the alert signal detection circuitry in the tablet embedded controller 322 has again gone active in the predetermined time period after at least one reset following initially going active at time $T_1$ 604a). In response, the response engine 318 may determine that the alert signal is a priority event alert signal that is associated with a priority event action that includes the actions detailed in blocks 418-422, and will proceed to those blocks as discussed below.

In some embodiments, the response database 320 may include different priority event signals that are associated with respective different priority event actions, and each of those priority event signals may be distinguished from the other priority event signals based on a number of signal pulses included in the priority event signal. As such, at decision block 408, the response engine may determine a number of alert pulses that were provided in a priority event signal, and use that number of alert pulses to determine a particular priority event alert signal of a plurality of priority event alerts and its associated priority event action. For example, the response engine may determine the three alert pulses 802, 804, and 806 that were provided in the priority event alert signal 800, and use the three alert pulses to distinguish the priority event alert signal 800 from a plurality of priority event alert signals in the response database 320 and retrieve a priority event action that is associated with the priority event alert signal 800. Similarly, the response engine may determine the five alert pulses that were provided in the priority event alert signal 900, and use the five alert pulses 902, 904, 9006, 908, and 910 to distinguish the priority event alert signal 900 from a plurality of priority event alert signals in the response database 320 and retrieve a priority event action that is associated with the priority event alert signal 900. In other embodiments in which the encoding of more high priority events is desired, rather than "counting" pulses, the pulse train may be interpreted as a UART type of pulse train that would allow for a higher number of encodings with a minimal number of patterns, as discussed in further detail below.

The method 400 the proceeds to block 418 where the data transmission operation is paused by the receiver device. In an embodiment, the response engine 318 instructs the tablet embedded controller 322 to perform a priority event action associated with the priority event alert signal determined at decision block 408, and the tablet embedded controller 322 enters an interrupt service routine (ISR) such that the data transmission operation that was being performed as discussed with reference to block 404 is paused. The method 400 then proceeds to block 420 where the priority event is addressed by the receiver device. Subsequent to pausing the data transmission operation, the tablet embedded controller 322 may address the priority event by performing low-latency priority event action retrieved from the response database 320 by the response engine 318. For example, a priority event action associated with the priority event of connecting a peripheral device (e.g., the display device 700 of FIG. 5c) to the base device 302 (e.g., via the display connector 313 as illustrated in FIG. 5c) may include the tablet embedded controller 322 activating a data transmission path such that data may be transmitted to the peripheral device (e.g., activating a video data path to the base device 302 such that the base device 302 may send such video data to the display device 700, and the display device 700 may begin to immediately operate as a second monitor for the tablet device 314).

In an embodiment, the addressing of the priority event at block 420 is such that no further actions are performed by the receiver device to address that priority event. For example, the activation of the data transmission path discussed above such that data may be transmitted to the peripheral device includes a priority event (e.g., the connection of the peripheral device to the sender device) that is addressed (e.g., activation of the data transmission path) such that no further actions need be performed by the receiver device to address the priority event (e.g., such that the peripheral device may now receive data from the receiver device). Thus, rather than entering an ISR, setting an alert flag during the ISR, exiting the ISR to resume the data transmission operations, and then addressing the event subsequent to completing the data transmission operations, embodiments of the I²C bus priority alert system include a receiver device that enters the ISR, addresses the priority event during the ISR such that no further actions need be performed by the receiver device to address that priority event, and then exits the ISR to resume the data transmission operations. As such, priority event actions for priority events may be defined such that they may be completed in the time period for a conventional ISR after the priority event is detected as discussed above.

In some embodiments of the present disclosure may include extending the ISR relative to conventional ISRs such that more extensive and time consuming priority event actions may be performed during the extended ISR. However, one of skill in the art will recognize that it is not good programming practice to provide an ISR that is relatively lengthy, as it is best to keep ISRs as short as possible in order to avoid missing other potential interrupt handling that needs to be performed, and to avoid using up processing bandwidth in one ISR. For example, an overly lengthy ISR could break the I²C communications that were in progress prior to the time the interrupt took place.

The method 400 then proceeds to block 422 where the data transmission operation is resumed and completed by the receiver device. In an embodiment, following addressing the priority event, the tablet embedded controller 322 may exit the ISR and immediately return to the data transmission operation that was paused at block 420, resuming and completing that data transmission operation. Thus, the priority event may be addressed by the receiver device quickly and within the ISR without the need for adding complexity to the communications (e.g., additional coding) or resorting to conventional full I²C communication transactions within the ISR.

In the specific example using the I²C bus priority alert system 300 illustrated and discussed with reference to FIG. 5c, a low latency requirement was provided for the response by the tablet device 314 to an HPD signal that is generated in the base device 302 and results from the connection of the display device 700 to the base device 302. The alerting of the tablet device 314 by the base device 302 upon the HPD signal being generated was required to be addressed by the tablet embedded controller 322 within a 2 millisecond (ms) timing window in order to meet timing specifications that are intended to provide a good user experience by providing prompt discovery and configuration of newly connected display devices. While this 2 ms timing window can be met when the SMBus link 500 is free, it was found that that when conventional I²C alert operations were performed by the tablet embedded controller 322 when it was already executing data transmission operations on the SMBus link 500, the 2 ms timing window passed and the operation timed out and was considered an unplug event. The use of the alert signal pulses and corresponding priority event actions by the tablet embedded controller 322 discussed above have been found to keep the response time of the tablet computer device 314 to the HPD signal generated in the base device 302 below the 2 ms time window, eliminating the time out operations associated with delays in response to the connection of the display device 700 to provide a better user experience. Furthermore, such benefits are accomplished without the need to add pins on the connectors to handle the new priority event signals (e.g., routing the HPD event signal through a new pin on the connector) and instead leveraging an existing connection with the novel alert signals described herein. However, the systems and methods of the present disclosure are not limited to such specific embodiments, as such priority alert signaling is envisioned as being beneficial for alerting about a variety of different events on a variety of different buses known in the art.

While the embodiment discussed above are associated with a single priority event alert that is received during data transmission operations on an I²C bus, one of skill in the art in possession of the present disclosure will recognize that nested priority alerts may be incorporated in the systems and methods described above while remaining within the scope of the present disclosure. For example, priority events may be prioritized relative to each other, and lower priority events may be interrupted by higher priority events using the priority event alerts discussed above. As such, a receiver device may be executing data transmission operations when a sender device detects a first priority event and sends a first priority event alert that causes the receiver device to pause the data operations and begin to address the first priority event. The sender device may then detect a second priority event that is higher priority than the first priority event and, in response, send a second priority event alert that causes the receiver device to pause the addressing of the first priority event and begin addressing the second priority event. Upon addressing the second priority event, the receiver device may then return and address the first priority event, and upon addressing the first priority event, the receiver device may resume the data transmission operations.

Furthermore, the systems and methods of the present disclosure are not limited to distinguishing priority alerts from non-priority alerts using the alert pulses described above. Rather, more complex alert signals may be embedded in the I²C alert signal and transferred between a sender device and a receiver device within an ISR to bypass the latency/overhead associated with a full I²C alert transaction. For example, a protocol similar to the universal asynchronous receiver/transmitter (UART) protocol (at single cycle instruction speeds) could be used as a priority alert signal to replace the pulse train shown in the FIGS. 5d and 5e and encode the high priority event as a byte value with only 9-10 bits as per the UART protocol.

Thus, systems and methods for providing alerts over an I²C bus have been described that allow a sender device to send, and a receiver device to receive, both non-priority alert signals associated with non-priority events and priority alert signals associated with priority events. By distinguishing between non-priority events and priority events, the receiver device can respond to non-priority event conventionally (e.g., by setting a flag and then addressing the non-priority event once current data transmission operations are completed), while responding to priority events by addressing them before current data transmission operations are completed. This allows priority events to be defined and alerted over an I²C bus such that typically high-latency I²C bus systems can respond to low-latency requirements to meet timing specifications such that time-out operations are avoided. With I²C bus systems, this allows the use of the alert signal to avoid having to deal with multi-master arbitration, avoids initiating traffic within ISRs to keep ISR execution time at a minimum, and prevents the need to replace the bus with a higher pin count so that additional alert signals and communications may be utilized.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method, comprising:
    receiving, by a receiver device over an inter-integrated circuit (I²C) bus, a first priority event alert signal from a sender device;
    receiving, by the receiver device over the I²C bus, a non-priority event alert signal from the sender device;
    pausing, by the receiver device, a current data transmission operation that is being performed over the I²C bus;
    determining, by the receiver device, that the first priority event alert signal is associated with the first priority event action in a response database and, in response, performing, by the receiver device, the first priority event action that is associated with the first priority event alert signal and that addresses a first priority event such that no further actions are performed by the receiver device to address the first priority event; and
    determining, by the receiver device, that the second priority event alert is associated with the second priority event action in the response database and, in response, performing, by the receiver device, the second priority event action that is associated with the second priority event alert signal and that is different than the first priority event action, wherein the second priority event action addresses a second priority event that is different than the first priority event such that no further actions are performed by the receiver device to address the second priority event.

2. The method of claim 1, wherein the first priority event alert signal includes a plurality of alert signal pulses.

3. The method of claim 1, wherein the first priority event includes a connection of a peripheral device to the sender device.

4. The method of claim 3, wherein the first priority event action includes performing operations to send a data signal to the peripheral device.

5. The method of claim 1, further comprising:
    receiving, by the receiver device over the I²C bus, a non-priority event alert signal that is associated with a non-priority event from the sender device;
    pausing, by the receiver device, a current data transmission operation that is being performed over the I²C bus;
    setting, by the receiver device, a non-priority event alert flag in response to receiving the non-priority event alert signal;
    completing, by the receiver device, the current data transmission operation; and
    addressing, by the receiver device, the non-priority event subsequent to completing the current data transmission operation and in response to the non-priority event alert flag being set.

6. A method, comprising:
    receiving, by a receiver device over an inter-integrated circuit (I²C) bus, a first priority event alert signal from a sender device;
    receiving, by the receiver device over the I²C bus, a non-priority event alert signal that is associated with a non-priority event from the sender device;
    pausing, by the receiver device, a current data transmission operation that is being performed over the I²C bus;
    setting, by the receiver device, a non-priority event alert flag in response to receiving the non-priority event alert signal;
    performing, by the receiver device, a first priority event action that is associated with the first priority event alert signal and that addresses a first priority event such that no further actions are performed by the receiver device to address the first priority event;
    completing, by the receiver device, the current data transmission operation; and
    addressing, by the receiver device, the non-priority event subsequent to completing the current data transmission operation and in response to the non-priority event alert flag being set.

7. The method of claim 6, wherein the first priority event alert signal includes a plurality of alert signal pulses.

8. The method of claim 6, further comprising:
    receiving, by the receiver device over the I²C bus, a second priority event alert signal from the sender device;
    pausing, by the receiver device, a current data transmission operation that is being performed over the I²C bus; and
    performing, by the receiver device, a second priority event action that is associated with the second priority event alert signal and that is different than the first priority event action, wherein the second priority event action addresses a second priority event that is different than the first priority event such that no further actions are performed by the receiver device to address the second priority event.

9. The method of claim 8, further comprising:
 determining, by the receiver device, that the first priority event alert signal is associated with the first priority event action in a response database and performing the first priority event action in response; and
 determining, by the receiver device, that the second priority event alert is associated with the second priority event action in the response database and performing the second priority event action in response.

10. The method of claim 6, wherein the first priority event includes a connection of a peripheral device to the sender device.

11. The method of claim 10, wherein the first priority event action includes performing operations to send a data signal to the peripheral device.

\* \* \* \* \*

UNITED STATES PATENT AND TRADEMARK OFFICE
CERTIFICATE OF CORRECTION

PATENT NO. : 9,632,960 B2  
APPLICATION NO. : 14/704710  
DATED : April 25, 2017  
INVENTOR(S) : Adolfo Sandor Montero It is certified that error appears in the above-identified patent and that said Letters Patent is hereby corrected as shown below:

In the Claims

In Column 15, Line 49: In Claim 1, please delete "non-", and add --second-- before priority;
In Column 15, Line 53: In Claim 1, please replace "the" with --a--;
In Column 15, Line 61: In Claim 1, please replace "the" with --a--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*